May 21, 1940.                B. D. McINTYRE                2,201,590
                                CONNECTOR
                            Filed Jan. 17, 1938

INVENTOR.
Brouwer D. McIntyre
BY
Whittemore Hulbert & Belknap
ATTORNEYS

Patented May 21, 1940

2,201,590

UNITED STATES PATENT OFFICE 2,201,590

CONNECTOR

Brouwer D. McIntyre, Monroe, Mich., assignor to Monroe Auto Equipment Company, Monroe, Mich., a corporation of Michigan Application January 17, 1938, Serial No. 185,472

3 Claims. (Cl. 287—85)

This invention relates to connectors of the type having a link and having a part provided with a portion substantially surrounded by a resilient material retained in the link under compression in such a manner that relative movement of the link and part is permitted by interparticle flow of the resilient material.

It is one of the principal objects of this invention to provide a connector of the type set forth wherein the link and part are secured together through the resilient material and wherein additional means is provided to prevent accidental disengagement of the part from the link.

Another object of this invention consists in the provision of a connecting link having a portion forming a housing containing a resilient bushing adapted to receive a substantially flat head on one end of a stud by inserting the stud head through an elongated opening in one side wall of the housing and rotating the head at an angle to the opening to effect a locking engagement of the stud with the link.

A further advantageous feature of this invention resides in the provision of a construction of the character set forth in the preceding paragraph embodying a removable pin extending transversely through the flat head of the stud into the bushing material at opposite sides of the head and having a length greater than the long axis of the elongated opening in the housing portion of the link to prevent accidental disengagement of the stud from the link.

Still another feature of this invention consists in the provision of a connector wherein the resilient bushing comprises a pair of sections centrally bored to receive the extremities of the retaining pin and to facilitate the flow of resilient material around the flat head when pressure is applied to the sections.

In addition to the foregoing, the present invention contemplates a bushing wherein the sections are provided with annular skirts or flanges at the adjacent ends cooperating with each other to receive the flat head on the stud.

The foregoing, as well as other objects, will be made more apparent as this description proceeds, especially when considered in connection with the accompanying drawing, wherein.

Figure 1:
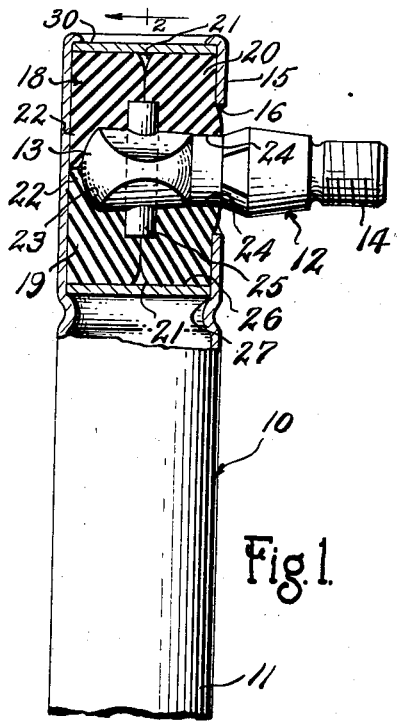
Figure 1 is an elevational view, partly in section, of a connector constructed in accordance with this invention.
Figure 2:
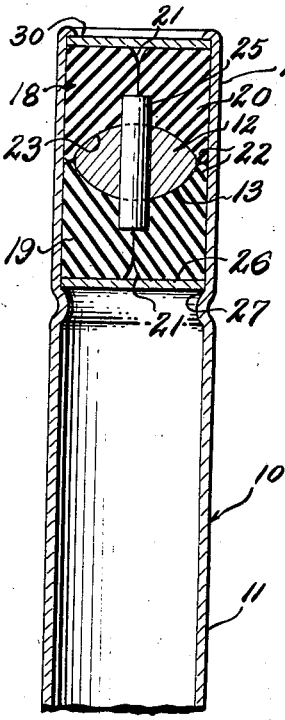
Figure 2 is a sectional view taken substantially on the plane indicated by the line 2—2 of Figure 1.
Figure 3:
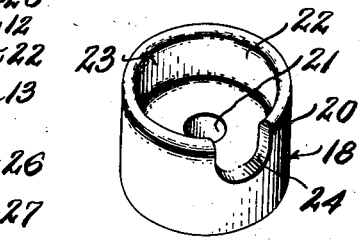
Figure 3 is a perspective view of one of the bushing sections.
Figure 4:
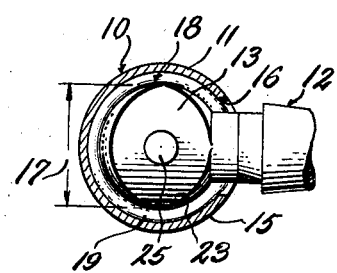
Figure 4 is a cross sectional view taken substantially on the plane indicated by the line 4—4 of Figure 1.

Although connectors constructed in accordance with this invention may be advantageously employed in practically any installation requiring a quite effective connection between two relatively movable parts, nevertheless, the nature of the construction of the link renders the same particularly useful in vehicle installations for connecting parts carried by the sprung assembly of the vehicle to parts carried by the unsprung assembly.

It will be observed from the drawing that the connector 10 comprises a link 11 and studs 12 having head portions 13 anchored in opposite ends of the link. The shank portions 14 of the studs are threaded for attachment to the parts it is desired to connect together by the link 11.

In the present illustrative embodiment of the invention, the link 11 is shown as being tubular in cross section and as having housings 15 at opposite ends thereof. One side wall of each of the housings 15 is provided with an elongated opening 16 therethrough having the long axis extending parallel to the axis of the link and of a length slightly greater than the diameter or dimension 17 of the substantially flat head 13 on the stud 12. The width of the short axis of the elongated opening 16 is less than the dimension 17 of the head 13 with the result that the head 13 must be inserted through the opening 16 with the dimension 17 extending parallel to the long axis of the opening. After the stud head 13 is extended through the opening 16 into the housing 15, the same is rotated throughout substantially 90° to extend the dimension 17 in a direction parallel with the short axis of the elongated opening and, since this short axis is of less length than the dimension 17, it necessarily follows that the stud is locked in the housing 15.

The head 13 of each stud is held in interlocking relationship with the housings 15 at opposite ends of the link 11 by means of resilient bushings 18 surrounding the heads 13 and secured under compression within the housing. In the present instance, the bushings 18 are formed of molded rubber and each bushing comprises a pair of sections 19 and 20. The sections of each bushing are assembled in one of the housings at opposite sides of the stud head extending into the housing and are provided with axially extending bores 21 therethrough to facilitate the flow of the resilient material around the head of the stud when pressure is exerted on the sections.

In order to insure surrounding the head 13 of the stud with the bushing material, the sections are provided with axially extending annular skirts or flanges 22 on adjacent ends thereof cooperating with each other to form a circular recess 23 for receiving the substantially flat head 13 of the stud. The axial flanges 22 of each pair of sections are cut away at one side of the bushing to form an opening 24 for receiving the shank portion of the stud adjacent the head of the latter.

In order to avoid any possibility of accidental disengagement of the studs from the link 11, I provide each head 13 of the stud with a removable pin 25. The pin 25 extends through each stud head 13 transversely to the dimension 17 and has a length greater than the long axis of the elongated opening 16 through the housing. The extremities of the pins 25 project equal distances from opposite sides of the stud heads and extend into the adjacent ends of the bores 21 through the sections of the bushings 18. Inasmuch as the lengths of the pins 25 are greater than the long axes of the elongated openings 16 through the housings 15 and, in view of the fact that the dimensions 17 of the stud heads 13 are greater than the short axes of the openings 16, it follows that the studs are effectively locked in the housings 15. In assembling the connector, a disc 26 is inserted into each housing 15 through the outer end of the latter and is positioned against an annular shoulder 27 formed by contracting the link 11 at the inner end of each housing. The inner section 19 of each bushing is then inserted in the housings in abutting engagement with the discs 26. After the inner sections 19 of the bushings have been assembled in their respective housings, the stud heads 13 are inserted through the openings 16 in the housings with the dimension 17 of the heads extending parallel to the long axes of the openings 16 and are then rotated throughout 90° so that the dimensions 17 of the stud heads extend at right angles to the long axes of the openings 16. In this final position of the stud heads, the inner sides of the latter assume positions in the circular recesses formed by the axially extending flanges 22 on the inner sections 19 of the bushings. The pins 25 are then sleeved into the transverse bores formed in the stud heads 13 in such a manner that the inner ends of the pins project into the bores 21 formed in the inner sections 19 of the bushings. Upon completion of this operation, the outer sections 20 of the bushings are sleeved into the housings 15 with the flanges 22 extending toward the corresponding flanges on the inner sections 19 and cooperating with the latter to provide resilient material around the stud heads. It will be understood that the outer ends of the pins 25 are received in the adjacent ends of the bores 21 in the sections 20 of the bushings when the latter are sleeved in the housings 15. A disc 30 is then engaged with the outer end of each bushing section 20 and pressure is applied to the discs to force the same against the action of the bushing material into the outer ends of the housings 15. As a result, the bushings are secured under compression against the stud heads and the extremities of the housings are swaged or spun over the peripheral edge portions of the outer discs 30 to secure the parts in assembled relationship.

From the foregoing, it will be noted that the stud heads are effectively anchored in opposite ends of the links through the medium of rubber bushings and that relative movement of the studs and links is permitted by interparticle flow of the bushing material. In this connection, the opposite side surfaces 31 of the stud heads may be transversely curved in order to facilitate relative movements between the studs and link.

What I claim as my invention is:

1. In a connector, a member having a portion forming a housing provided with an opening through one side wall thereof, a stud having a head extending into the housing through said opening, a resilient bushing comprising sections having the adjacent ends axially bored and secured in the housing under compression against opposite sides of the stud head, and a pin extending transversely through the stud head with the opposite ends extending into the axially bored portions of the sections and having a length greater than the maximum dimension of the opening.

2. In a connector, a member having a portion forming a housing provided with an opening in one wall, a stud having a head extending into the housing through the opening, a resilient bushing comprising sections having the adjacent ends axially bored and secured in the housing under compression against opposite sides of the stud head, said sections also having substantially annular flanges extending toward each other and cooperating to form a recess substantially enclosing the stud head, and a pin extending transversely through the stud head with the opposite ends projecting into the axially bored portions of the sections and having a length greater than the maximum dimension of said opening.

3. In a connector, a member having a portion forming a housing provided with an elongated opening through one wall thereof, a stud provided with an elongated head having a length less than the long axis of the opening but greater than the small axis of the opening, whereby insertion of the elongated head into the housing through the opening is permitted and whereby said head is locked in the housing upon rotation of the stud to position the length of the head transversely of the long axis of the opening, a resilient bushing comprising sections having the adjacent ends axially bored and secured in the housing under compression against opposite sides of the stud head, and means projecting from opposite sides of the stud head into the axially bored portions of the sections and having a length greater than the long axis of the opening to lock the stud head in the housing.

BROUWER D. McINTYRE.